3,157,570
METHODS OF COMBATTING MICROORGANISMS
Walter T. Reichle, Millington, N.J., and Anthony A. Sousa, Raleigh, N.C., assignors to Union Carbide Corporation, a corporation of New York
No Drawing. Filed June 26, 1963, Ser. No. 290,584
5 Claims. (Cl. 167—30)

This invention relates generally to the use of phosphonitrile chlorides as fungicides and, more particularly, to the use of 1,1-diphenyl-3,3,5,5-tetrachlorophosphonitrile as a mildewcide.

Although numerous compounds exhibit biological properties which would qualify them for use as foliage fungicides, they are eliminated as practical candidates in this field because they also cause injury to the host plant.

An object of this invention is to provide a mildewcide which is not phytotoxic. Another object of this invention is to provide a mildewcide which is effective at relatively low concentrations. A further object of this invention is to provide a mildewcide which affords sustained biological activity.

It has been found that 1,1-diphenyl-3,3,5,5-tetrachlorophosphonitrile, $$\begin{array}{c} C_6H_5 \quad C_6H_5 \\ \diagdown \diagup \\ P \\ \diagup \diagdown \\ Cl-N \quad\quad N-Cl \\ \| \quad\quad\quad | \\ P \quad\quad P \\ \diagup \diagdown \diagup \diagdown \\ Cl \quad N \quad Cl \end{array}$$

exhibits effective mildewcidal properties with substantially no phytotoxic effects. It is particularly effective against *Erysiphe polygoni*, the casual organism of powdery mildew of bean, in concentrations as low as 20 parts per million and against *Podosphaera laucotricha* (powdery mildew of apple) at 50 parts per million. This compound also evinces excellent retention of biological activity following formulation.

The potency and permanency of 1,1-diphenyl-3,3,5,5-tetrachlorophosphonitrile as a mildewcide against bean powdery mildew are demonstrated in the following series of tests.

TABLE 1

| Concentration (Parts per million) | 0 Hour | 1 Hour | 3 Hours | 24 Hours |
|---|---|---|---|---|
| 500 | 5 | 5 | 5 | 5 |
| 100 | 5 | 5 | 5 | 5 |
| 20 | 4.5 | 5 | 5 | 5 |

[1] The rating system used is the average of two replicates based on the relative scale of 1 (no control) to 5 (complete control).

These data clearly show that 1,1-diphenyl-3,3,5,5-tetrachlorophosphonitrile remains effective as a mildewcide for at least twenty-four hours after formulation. Specific details of the procedure used to obtain these data are presented below.

*Biological Test Procedure*

A stock suspension of 1,1-diphenyl-3,3,5,5-tetrachlorophosphonitrile was prepared by dissolving one gram in 50 ml. of acetone in which had been dissolved 0.1 g. of octylphenoxy polyethoxyethanol as an emulsifying agent. The resulting solution was mixed into 150 ml. of water to give 200 ml. of a suspension containing the above nitrile in finely divided form. The various test concentrations described in parts per million were prepared by dilution of this stock solution.

Tendergreen beans were used as the host plant for the bean mildew, *Erysiphe polygoni*. A culture of this organism was maintained on bean plants in a greenhouse. Forty-eight hours prior to testing, uninfected plants with primary leaves fully expanded were inoculated by brushing their leaves lightly with plants taken from the stock culture.

The bean plants infected with mildew were sprayed on a revolving turntable for 30 seconds at a pressure of 40 p.s.i.g. Approximately 100 ml. of spray were delivered. An equal volume of a water solution containing acetone and emulsifier in the same concentrations as the stock suspension above but without the candidate mildewcide, 1,1-diphenyl-3,3,5,5-tetrachlorophosphonitrile, was also sprayed on six infected plants which were used as control plants.

After the spray had dried the plants were held in a greenhouse for a period of 7–10 days. At the end of this period the results were checked visually according to the following designations:

5=100% control, no spots per leaf
4=1–3 spots per leaf
3=4–10 spots per leaf
2=many but distinctively different spots
1=leaf overrun with mildew; equal to check plants The useful range of concentration of 1,1-diphenyl-3,3,5,5-tetrachlorophosphonitrile against bean and apple powdery mildew is from about 20 to about 500 parts per million. A preferred concentration with beans is from about 20 to about 100 parts per million and with apples 400 to 500 parts per million.

No harm was caused to the host plants in the foregoing tests, that is no phytotoxic effects such as leaf curl, burning, chlorosis, wilting and the like occurred.

The preparation of 1,1-diphenyl-3,3,5,5-tetrachlorophosphonitrile is demonstrated by the example below. Other methods described in the technical literature can also be employed to prepare this compound as for instance those of H. Bode and H. Bach, Ber. 75, 215 (1942) and K. John, Thesis, University of Heidelberg, Germany (1959).

EXAMPLE.—PREPARATION OF 1,1-DIPHENYL-3,3,5,5-TETRACHLOROPHOSPHONITRILE

Dry benzene (3,500 ml.; 6.0 moles) was refluxed with aluminum chloride (769 g.; 5.77 moles) and phophonitrile chloride trimer (558 g.; 1.60 moles) for 22 hours in a round-bottom three-neck flask equipped with a mechanical stirrer, thermometer and reflux condenser. During the course of the reaction the original slurry changed to a two phase system consisting of two immiscible liquids. The reaction product was then gradually and with efficient mechanical agitation poured over a mixture of 10 lbs. of ice, 4 lbs. of powdered Dry Ice, and 2 lbs. of concentrated HCl contained in a large beaker. This slurry was warmed to 25° C. and extracted twice with methylene chloride. The organic layer was isolated in a separatory funnel and dried first over anhydrous $MgSO_4$ and then over anhydrous $Na_2CO_3$. The volatile components, viz, unreacted benzene and methylene chloride, were removed by distillation on a steam bath. Unreacted phosphonitrile chloride trimer (268 g.; 0.77 mole) was recovered by flask distillation up to a pot temperature of 190° C./7 mm. The distillation residue was dissolved while hot in 500 ml. of pentane. Upon cooling, 257 g. of 1,1-diphenyl-3,3,5,5-tetrachlorophosphonitrile crystallized out of solution. This product after filtration and drying had a melting point of 93.5–94.5° C. (The literature melting point is 96.5–97.5° C. as reported in Ber., 75, 215 (1942).) This represents a 37.1% yield based on the phosphonitrile consumed in the reaction. Recrystallization from boiling heptane afforded a product with a melting point of 95.5–96.5° C.

Although the invention has been described with a certain degree of particularity, it is understood that the present disclosure of the preferred forms has been made only by way of illustration and that numerous changes can be made in the preparation of 1,1-diphenyl-3,3,5,5-tetrachlorophosphonitrile and its application as a mildewcide without departing from the spirit and the scope of the invention hereinafter claimed.

What is claimed is:

1. The method of controlling mildew which comprises contacting the causative organism with effective amounts of 1,1-diphenyl-3,3,5,5-tetrachlorophosphonitrile.

2. The method of combatting mildew in infested plants which comprises applying to the infested plants effective amounts of 1,1-diphenyl-3,3,5,5-tetrachlorophosphonitrile.

3. The method of protecting plants against mildew diseases which comprises applying to the plants effective amounts of 1,1-diphenyl-3,3,5,5-tetrachlorophosphonitrile.

4. The method of controlling powdery mildew of bean which comprises contacting the causative organism on the bean with effective amounts of 1,1-diphenyl-3,3,5,5-tetrachlorophosphonitrile.

5. The method of controlling powdery mildew of apples which comprises contacting the causative organism on the apple with effective amounts of 1,1-diphenyl-3,3,5,5-tetrachlorophosphonitrile.

No references cited.